United States Patent [19]

Janek

[11] Patent Number: 4,981,211

[45] Date of Patent: Jan. 1, 1991

[54] VIDEOTAPE CASSETTE STORAGE CONTAINER HAVING A PHOTOGRAPH MAT

[76] Inventor: Mary K. Janek, Rte. 1, Box 32-A, Farmland, Ind. 47340

[21] Appl. No.: 515,918

[22] Filed: Apr. 27, 1990

[51] Int. Cl.⁵ .......................... B44C 5/02; G09F 3/00; B65D 85/672
[52] U.S. Cl. ....................... 206/387; 40/312; 40/158.1
[58] Field of Search ........... 206/387, 472, 232; 40/312, 158.1, 159, 159.1, 159.2

[56] References Cited

U.S. PATENT DOCUMENTS

| | | | |
|---|---|---|---|
| 3,865,237 | 2/1975 | Isaacs | 206/387 X |
| 4,433,780 | 2/1984 | Ellis | 206/387 X |
| 4,643,301 | 2/1987 | Hehn et al. | 206/387 X |
| 4,717,021 | 1/1988 | Ditzig | 206/387 |
| 4,765,466 | 8/1988 | Ivey | 206/387 X |
| 4,789,061 | 12/1988 | Roze | 206/387 |
| 4,828,105 | 5/1989 | Silengo et al. | 206/387 X |

FOREIGN PATENT DOCUMENTS

| | | | |
|---|---|---|---|
| 2518297 | 6/1983 | France | 206/387 |
| 2030545 | 4/1980 | United Kingdom | 206/387 |
| 2093790 | 9/1982 | United Kingdom | 206/387 |

*Primary Examiner*—William I. Price
*Attorney, Agent, or Firm*—H. Jay Spiegel

[57] ABSTRACT

The present invention relates to an improved videotape cassette storage container. The improved videotape cassette storage container includes a photograph mat mounted on the cover thereof. The photograph mat may be used to display a photograph that is relevant to a videotape enclosed in the container.

6 Claims, 2 Drawing Sheets

VIDEOTAPE CASSETTE STORAGE CONTAINER HAVING A PHOTOGRAPH MAT

BACKGROUND OF THE INVENTION

The present invention relates to an improved videotape cassette storage container. In the prior art, storage containers for videotape cassettes are known. U.S. Pat. No. 4,643,301 to Hehn et al. discloses a videotape cassette storage container having a pocket therein for holding a booklet or similar material. U.S. Pat. No. 4,789,061 to Roze discloses a magnetic tape cassette container having a book-like cover. However, Applicant is unaware of any prior art that teaches or fairly suggests a videotape cassette container having a photograph mat attached to the cover thereof.

SUMMARY OF THE INVENTION

The present invention relates to an improved videotape cassette storage container. The present invention includes the following interrelated aspects and features:

(A) In a first aspect, the improved videotape cassette storage container includes a conventional videotape cassette container. Attached to the cover of the videotape cassette storage container is a photograph mat. The photograph mat may include a photograph that is relevant to the material contained on a videotape located inside the container.

(B) The photograph mat may be attached to the cover in a manner so as to permit placement of a photograph therein.

(C) The container may also include an elongated member pivotally attached to the backside thereof. The elongated member may support the container in an upright position for viewing of a photograph displayed in the photograph mat.

Accordingly, it is a first aspect of the present invention to provide an improved videotape cassette storage container.

It is a further aspect of the present invention to provide a videotape cassette storage container having a photograph mat mounted on the cover thereof.

It is a yet further object of the present invention to provide a videotape cassette storage container which facilitates viewing of a photograph that is relevant to a videotape within the storage container.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
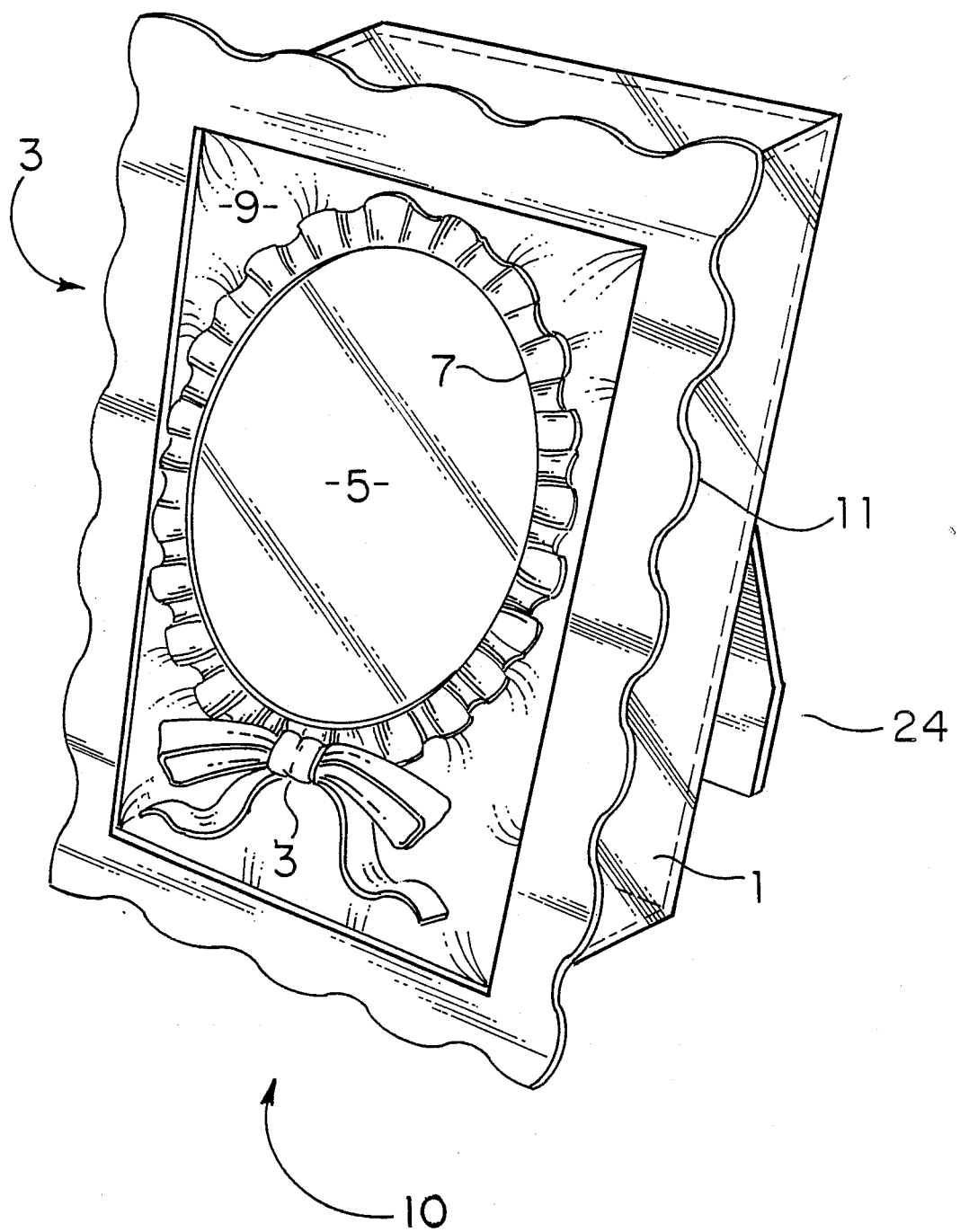
FIG. 1 shows a perspective front view of the improved videotape cassette storage container.

With reference to FIG. 1 firstly, the improved videotape cassette storage container is generally designated by the reference numeral 10, and is seen to include a videotape container 1 and a photograph mat 3 attached on the cover thereof.

The photograph mat 3 includes a plastic sheet 5 under which a photograph may be inserted, a lace-type border 7 surrounding the oval-shaped plastic sheet 5, a bow 3 attached to the lace-type border 7, a tufted fabric portion 9 surrounding the lace-type border 7 and an outer border 11.

Figure 2:
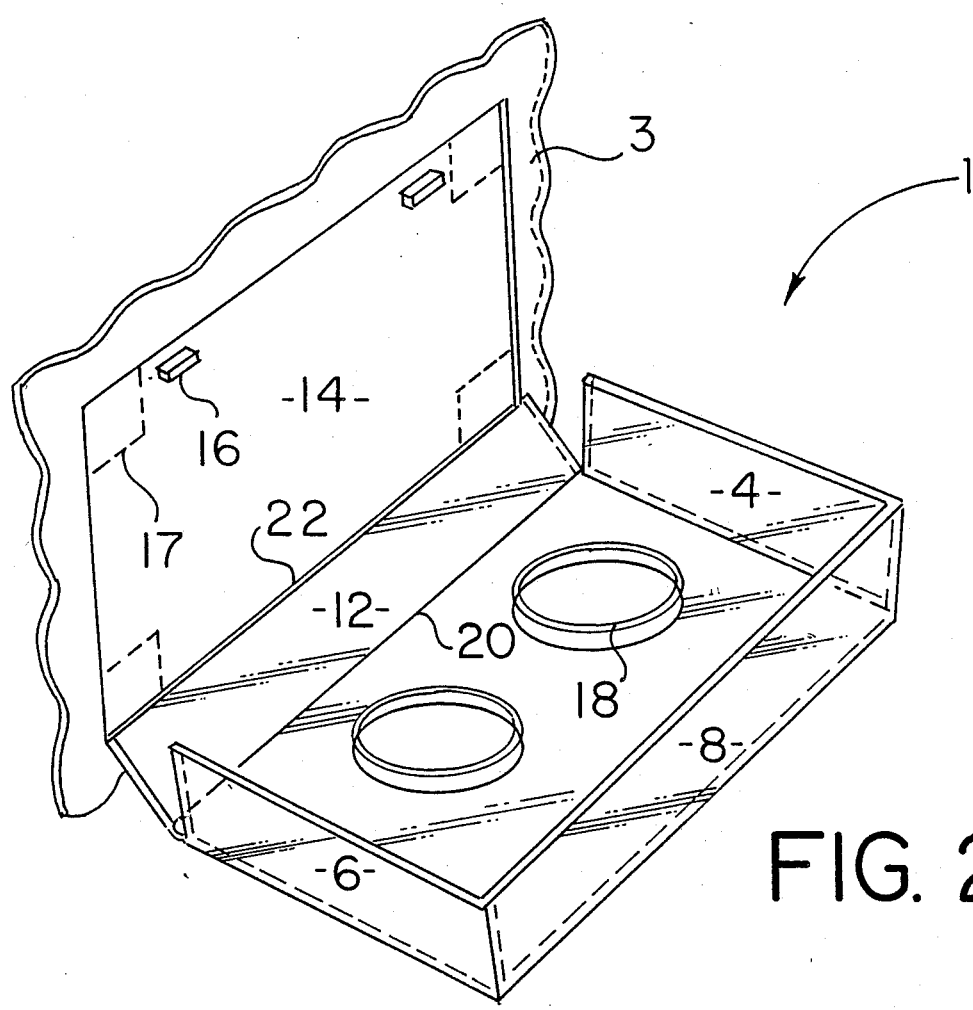
FIG. 2 shows the improved videotape cassette storage container in an open configuration.

With reference to FIG. 2, the improved videotape cassette storage container is shown in the open configuration and more clearly depicts the videotape container 1. As can be seen from FIG. 2, the videotape container includes a flat, bottom wall 2 surrounded on three sides by a pair of sidewalls 4 and 6, and an end wall 8 which forms an enclosure. A pair of spaced projections 18 are formed on the bottom wall 2 of the container which engage the hubs of a videotape cassette for retaining the cassette within the enclosure. An opposite end wall 12 is hingedly mounted to the bottom wall 2 at the reference numeral 20 and hingedly mounted to the cover 14 at the reference numeral 22. The top cover 14 includes projections 16 thereon which facilitate closing of the cover. The photograph mat 3 may be attached to the cover by a plurality of hook and pile fastening means 17. The detachable mounting of the photograph mat 3 on the cover 14 permits a photograph to be inserted underneath the photograph mat 3 for display. Of course, other means of attaching the photograph mat 3 to the cover 14 may be utilized which permit access to the photograph mat opening such as adhesives, attaching clips or the like.

Figure 3:
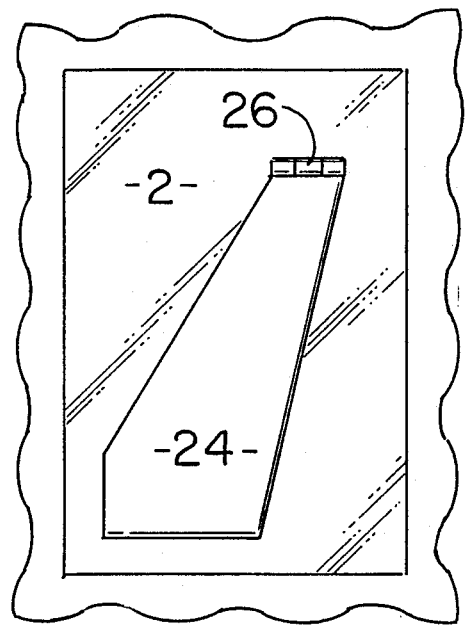
FIG. 3 shows a rear view of the improved videotape cassette storage container.

FIG. 3 shows a rear view of the storage container, more clearly depicting an elongated member 24 pivotally attached at the reference numeral 26 to the bottom wall 2. The elongated member 24 may support the videotape cassette storage container in an upright position so that a photograph may be viewed while displayed under the photograph mat.

The storage container may be made out of a plastic material and the photograph mat may be made out of a combination of plastic and fabric materials. Of course, other designs including combinations of different types of fabrics and/or plastics may be utilized in the photograph mat.

The improved videotape cassette storage container provides a means for displaying a photograph that is relevant to the videotape located within the videotape cassette storage container. For example, a wedding or graduation picture may be displayed in the photograph mat with a videotape of the wedding or graduation ceremony being included in the storage container.

As such, an invention has been disclosed in terms of a preferred embodiment thereof which fulfills each and every one of the objects of the invention as set forth hereinabove and provides a new and improved videotape cassette storage container of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. An improved videotape cassette storage container comprising:
   (a) a container for storing a videotape, said container having a removable cover;
   (b) a photograph mat; and (c) means to attach said photograph mat to said cover.

2. The invention of claim 1, further comprising a means to support said videotape container in an upright position to facilitate viewing of a photograph in said photograph mat.

3. The invention of claim 2, wherein said means to support said videotape further comprises an elongated member pivotally attached to said container.

4. The invention of claim 1, wherein said photograph mat further comprises a padded fabric member having an opening therein for viewing of a photograph, said opening and said padded fabric member each surrounded by a lace fabric.

5. The invention of claim 1, wherein said means for attaching said photograph mat to said cover include hook and pile fastening means.

6. The invention of claim 1, wherein said means for attaching said photograph mat to said cover includes an adhesive.

* * * * *